US008866445B2

(12) United States Patent
Carder

(10) Patent No.: US 8,866,445 B2
(45) Date of Patent: Oct. 21, 2014

(54) FAULT-TOLERANT POWER SUPPLY

(75) Inventor: Craig Carder, Brighton, MA (US)

(73) Assignee: HeartWare, Inc., Miami Lakes, FL (US)

(*) Notice: Subject to any disclaimer, the term of this patent is extended or adjusted under 35 U.S.C. 154(b) by 368 days.

(21) Appl. No.: 13/271,587

(22) Filed: Oct. 12, 2011

(65) Prior Publication Data

US 2012/0086402 A1 Apr. 12, 2012

Related U.S. Application Data

(60) Provisional application No. 61/392,335, filed on Oct. 12, 2010.

(51) Int. Cl.
*H02J 7/00* (2006.01)
*H02J 1/10* (2006.01)
*H02J 1/12* (2006.01)
*H02J 7/34* (2006.01)

(52) U.S. Cl.
CPC . *H02J 1/108* (2013.01); *H02J 1/12* (2013.01); *H02J 7/34* (2013.01)
USPC .......................................... 320/134; 320/118

(58) Field of Classification Search
USPC ........................................................ 320/121
See application file for complete search history.

(56) References Cited

U.S. PATENT DOCUMENTS

| 4,181,842 A * | 1/1980 | Elias et al. .................... 307/66 |
| 4,698,578 A * | 10/1987 | Mullersman et al. ......... 320/121 |
| 4,812,672 A * | 3/1989 | Cowan et al. .................... 307/64 |
| 5,323,100 A * | 6/1994 | Iketani .......................... 320/135 |
| 5,414,304 A * | 5/1995 | Loistl et al. .................. 307/10.1 |
| 6,122,181 A * | 9/2000 | Oughton, Jr. .................... 363/37 |
| 6,909,201 B2 * | 6/2005 | Murty et al. ................. 307/10.1 |
| 7,378,818 B2 * | 5/2008 | Fowler et al. ................. 320/119 |
| 7,825,615 B2 * | 11/2010 | Chen et al. .................... 318/139 |
| 2003/0184934 A1 * | 10/2003 | Bushue et al. .................. 361/62 |
| 2005/0185352 A1 | 8/2005 | Nguyen |
| 2007/0279953 A1 | 12/2007 | Hoff et al. |
| 2009/0206841 A1 | 8/2009 | Weng |
| 2009/0244944 A1 * | 10/2009 | Jang et al. ..................... 363/126 |
| 2009/0261783 A1 * | 10/2009 | Gonzales et al. ............. 320/121 |
| 2009/0322287 A1 * | 12/2009 | Ozeki et al. .................... 320/145 |

OTHER PUBLICATIONS

International Search Report issued by the International Searching Authority (ISA/US) on Mar. 5, 2012 in connection with International Application No. PCT/US11/55920.
Written Opinion of the International Searching Authority issued by the International Searching Authority (ISA/US) Mar. 5, 2012 in connection with International Application No. PCT/US11/55920.

(Continued)

*Primary Examiner* — Edward Tso
*Assistant Examiner* — Ramy Ramadan
(74) *Attorney, Agent, or Firm* — Lerner, David, Littenberg, Krumholz & Mentlik, LLP

(57) ABSTRACT

In some embodiments, a power supply system includes two power modules each configured to be electrically coupled to a set of battery cells. The set of battery cells produces a first voltage when in a first operational state, and a second voltage when in a second operational state. The second voltage is less than the first voltage. The first power module is configured to provide a third voltage to a load device that is substantially equal to the first voltage, when the set of battery cells is in the first operational state. The second power module is configured to provide a fourth voltage to the load device that is substantially equal to the first voltage, when the set of battery cells is in the second operational state.

19 Claims, 6 Drawing Sheets

(56) References Cited

OTHER PUBLICATIONS

International Preliminary Report on Patentability issued by the International Bureau of WIPO on Apr. 16, 2013 in connection with International Application No. PCT/US2011/055920.

Written Opinion of the International Searching Authority issued by the International Searching Authority (ISA/US) on Mar. 5, 2012 in connection with International Application No. PCT/US2011/055920.

* cited by examiner

FAULT-TOLERANT POWER SUPPLY

CROSS-REFERENCE TO RELATED APPLICATION

This application claims the benefit of U.S. Provisional Patent Application No. 61/392,335, filed Oct. 12, 2010, entitled "Redundant Battery Pack", the disclosure of which is incorporated herein by reference in its entirety.

BACKGROUND

The methods and apparati described herein relate generally to power supply systems, and, in particular, to methods and apparati for providing battery-based power to a load, by way of a power supply system including a multiple cell battery pack or module.

The operation of certain electronic devices, such as implanted heart pumps, requires continuous application of power, i.e., voltage and current, derived from an implanted battery source. Typically, the battery source is a battery module including a set of interconnected rechargeable battery cells. It is often critical for such devices that the required power is delivered in spite of battery cell failures which might occur during the operation of the base electronic, or load, device.

Some known power supply systems for meeting the continuous, and fault-tolerant power requirements of such electronic devices, consist of a battery pack including multiple interconnected battery cells as a primary source of power, and a control circuit that controls ancillary operations relating to the battery cells, such as control of re-charging rate and discharge rate and the like. Typically, the control circuit provides a protection for the power supply system, so that neither the power supply system, nor a load device coupled thereto, is damaged in the event of one or more batteries cell failures. In some known power supply systems, the control circuit shuts down the power supply system when one or more battery cells fail to operate properly, including the shutdown of both the failed battery cells as well as remaining still-functional battery cells. Such a power supply system is not acceptable where a continuous supply of power is critical and interruptions cannot be tolerated, and where direct access to the battery cells for replacement, is not practical (e.g., certain military applications, satellite applications, and implanted medical device applications, and the like).

In some other known power supply systems having a multiple cell battery pack for primary power, a secondary (redundant) battery pack packaged in or near the primary power pack, provides power to a load coupled thereto, when the primary battery pack fails to provide sufficient power. For such systems, a control circuit of the power supply system, generally detects a failure of the one or more cells of the primary battery pack, and upon such detection, switches operation to the redundant battery. The aggregate number of battery cells in such a power supply system is greater than the number of battery cells used at any given moment, which increases cost and reduces efficiency. Such a power supply system is not acceptable where a continuous supply of power is critical and interruptions cannot be tolerated, and where there is no practical volume for the storage of the redundant battery pack.

Accordingly, a need exists for an apparatus and/or method to enable a multiple battery cell-based power supply system to provide power continuously to a load device, in the event of a battery cell failure, without requiring replacement of failed cells or redundant battery cells. Such an apparatus is referred to below as a "fault tolerant" power supply system.

SUMMARY

In some embodiments, a power supply system includes two power modules, each configured to be electrically coupled to a set of battery cells. The set of battery cells produces a first voltage when in a first operational state, and a second voltage when in a second operational state. The second voltage is less than the first voltage. The first power module is configured to provide a third voltage to a load device that is substantially equal to the first voltage, when the set of battery cells is in the first operational state. The second power module is configured to provide a fourth voltage to the load device that is substantially equal to the first voltage, when the set of battery cells is in the second operational state.

DETAILED DESCRIPTION

Figure 1:
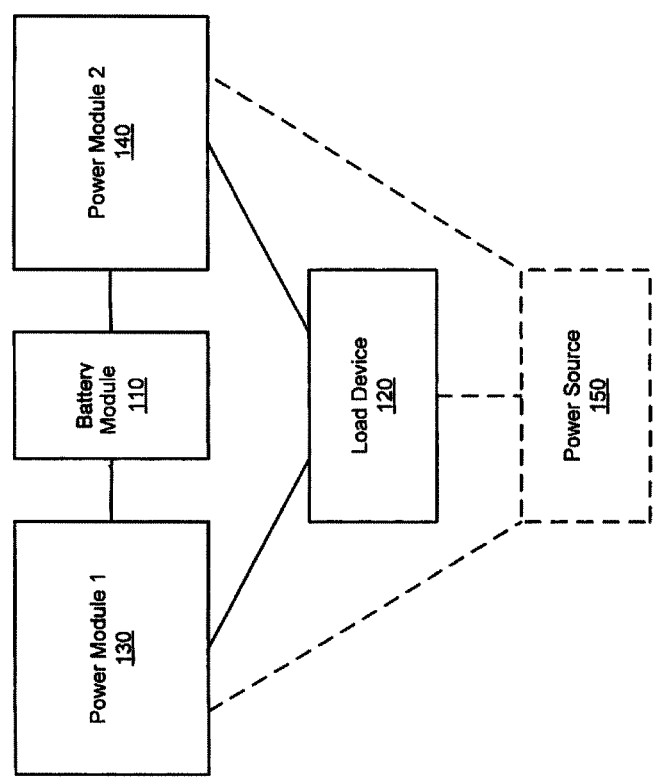
FIG. 1 is a system block diagram of a power supply system, according to an embodiment.

In some embodiments, a power supply system includes two power modules, each configured to be electrically coupled to a set of battery cells. The set of battery cells produces a first voltage when in a first operational state, and a second voltage when in a second operational state. The second voltage is less than the first voltage. The first power module is configured to provide a third voltage to a load device that is substantially equal to the first voltage, when the set of battery cells is in the first operational state. The second power module is configured to provide a fourth voltage to the load device that is substantially equal to the first voltage, when the set of battery cells is in the second operational state.

In some embodiments, a power supply system includes two power modules and a set of battery cells. Each power module is electrically coupled to the set of battery cells and can supply power to a load device. Specifically, the first power module can provide power to the load device when each battery cell produces a voltage within an operational range. The output voltage provided by the first power module is substantially equal to the voltage provided by the battery cells when each battery cell produces a voltage within the operational range. On the other hand, the second power module can provide power to the load device when one or more battery cells produce a voltage below the operational range (e.g., due to a battery cell failure). The output voltage provided by the second power module is also substantially equal to the voltage provided by the battery cells when each battery cell produces a voltage within the operational range.

In some embodiments, the second power module can receive an indication that one or more battery cells produce a voltage outside the operational voltage range (e.g., lower than the operational range). In response to the indication, the second power module can receive a voltage provided by the remaining battery cells that are still functional. Such a voltage can be less than the voltage provided by the first power module when each battery cell produces a voltage within the operational range. Furthermore, the second power module can use the voltage provided by the remaining functional battery cells to supply a voltage to the load device. The voltage supplied by the second power module can be substantially equal to the voltage provided by the first power module when each battery cell produces a voltage within the operational voltage range.

In some embodiments, an apparatus includes a secondary power module electrically coupled to a primary power module. The primary power module is coupled to a set of battery cells. When each battery cell produces a voltage within an operational voltage range, the primary power module can provide a voltage to a load device. When one or more battery cells produce a voltage outside the operational voltage range (e.g., lower than the operational range), the secondary power module can use a voltage provided by the set of battery cells to provide a voltage to the load device. The voltage provided by the secondary power module can be substantially equal to the voltage provided by the primary power module. Additionally, the voltage provided by the secondary power module to the load device can be greater than the voltage provided by the set of battery cells to the secondary power module.

As used herein, a module that is within a power supply system can be, for example, any assembly and/or set of operatively-coupled electrical devices that define one or more components within a power supply system. In some embodiments, a module can include, for example, a memory, a processor, integrated circuits, logics, interfaces, software (executing in hardware) and/or the like.

As used in this specification, the singular forms "a," "an" and "the" include plural referents unless the context clearly dictates otherwise. Thus, for example, the term "a control module" is intended to mean a single control module or a combination of control modules.

FIG. 1 is a system block diagram of a power supply system 100, according to an embodiment. The power supply system 100 includes a first power module 130, a second power module 140, a set of battery cells 110, and a load device 120. The first power module 130 can be operatively coupled to the battery cells 110, the second power module 140, and the load device 120. The second power module 140 can also be operatively coupled to the battery cells 110 and the load device 120. In some embodiments, the power supply system 100 can be operatively coupled to a power source 150.

Figure 2:
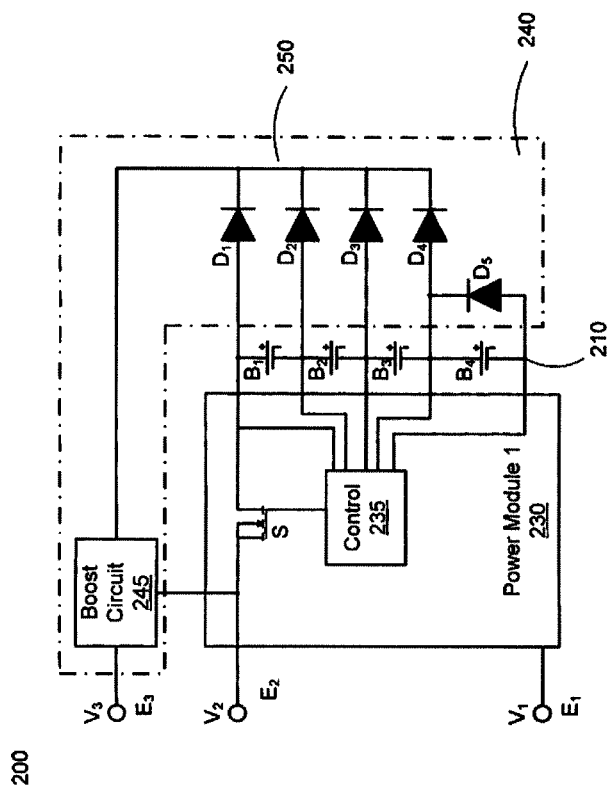
FIG. 2 is a schematic illustration of a power supply system, according to another embodiment.

The battery cells 110 can consist of multiple battery cells. Each battery cell can be electrically coupled, in series (and optionally in parallel), with one or more remaining battery cells. For example, as described in detail herein, FIG. 2 shows a set of four battery cells $B_1$-$B_4$ that are electrically coupled in series and are operatively coupled to a first power module 230 and a second power module 240. In some embodiments, the battery cells 110 can be a set of battery cells with a substantially similar amount of output voltage. For example, each battery cell can be a lithium ion rechargeable battery that can produce a nominal voltage of, for example, 3.7 V. In some other embodiments, the battery cells 110 can include different types of battery cells with a different amount of output voltage, including a lithium battery (e.g., 3.6 V), an alkaline battery (e.g., 1.5 V), a nickel-metal hydride (NIMH) rechargeable battery (e.g., 1.2 V), a nickel-cadmium (NiCd) rechargeable battery (e.g., 1.2 V), etc.

In some embodiments, the battery cells 110 can be a set of non-rechargeable batteries that can discharge (i.e., provide current) to the load device 120. The load device 120 can be a power-consuming device, i.e., an electronic device that can be driven by the power provided from a power supply system.

Furthermore, the load device 120 can be a power-consuming device for many applications in various fields, including medical (e.g., implantable pump for total heart replacement or ventricular assist, implantable neural stimulator, implantable pump for delivery of therapeutics, etc.), military (e.g., Electro-Magnetic Pulse weapons, intruder sensor system, etc.), industrial (e.g., portable vertical lifting device, automotive battery, etc.), consumer (e.g., hand-held game controller, smoke sensor detector, etc.), etc. Alternatively, the power supply system 100 can be electrically coupled to a power source 150, that can provide power to the load device 120. In some embodiments, the power source 150 can be a primary power source and the battery cells 110 can provide backup power to the load device 120 when the power source 150 does not provide power to the load device 120. In other embodiments, the power source 150 can be a backup power source and can provide power to the load device 120 when the battery cells 110 do not have sufficient power to drive the load device 120. The power source 150 can be a transcutaneous energy transmission (TET) system, a redundant battery pack, an external power supply with a socket, etc.

In some other embodiments, the battery cells 110 can be a set of rechargeable batteries that can discharge to the load device 120. In such embodiments, the power source 150 can be configured to recharge the battery cells 110. The power source 150 can also be configured to provide power to the load device 120 when the battery cells 110 do not have sufficient power to drive the load device 120 (e.g., while the power source 150 recharges the battery cells 120).

The first power module 130 can include a control module and other peripheral circuitry to control the discharge and recharge operation of the battery cells 110. In some embodiments, the first power module 130 can determine autonomously, based on the operational state of the battery cells 110 and the availability of the power source 150, when to electrically connect the battery cells 110 to, or electrically disconnect the battery cells 110 from, the load device 120 and/or the power source 150. For example, when the battery cells 110 are in a normal operational state, the first power module 130 can electrically connect the battery cells 110 to the load device 120 to enable a discharge operation. Similarly stated, the first power module 130 can electrically connect the battery cells 110 to the load device 120 such that the battery cells 110 can provide current to the load device 120. Alternatively, when the battery cells 110 do not have sufficient power to drive the load device 120, and the power source 150 is available, the first power module 130 can electrically connect the battery cells 110 to the power source 150 to enable a recharge operation. Similarly stated, the first power module 130 can electrically connect the battery cells 110 to the power source 150 such that the power source 150 can provide current to the battery cells 110. For another example, as described in detail herein, when the battery cells 110 are not in the normal operational state (e.g., in the event of a battery cell failure), the first power module 130 can electrically disconnect the battery cells 110 from the load device 120, and/or the power source 150, to disable any discharge or recharge operation.

In other embodiments, the first power module 130 can take manual commands from an outside recourse (e.g., a human operator) to control the discharge and recharge operation of the battery cells 110. For example, the first power module 130 can be controlled through a device that can be manually operated by a human operator (e.g., a switch, a button, a remote controller, etc.). The first power module 130 can be configured to electrically connect the battery cells 110 and the load device 120 to enable a discharge operation when the device is in a first state. Similarly, the first power module 130 can be configured to electrically disconnect the battery cells 110 and the load device 120, and/or to entirely shut down the first power module 130, when the device is in a second state. Furthermore, the first power module 130 can be configured to electrically connect the battery cells 110 and the power source 150 (if the power source 150 is available) to enable a recharge operation, when the device is in a third state.

Similar to the first power module 130, the second power module 140 can include circuitry to control the discharge and recharge operation of the battery cells 110. In some embodiments, as described in detail herein, the second power module 140 does not electrically connect the battery cells 110 to the load device 120 when the first power module 130 electrically connects the battery cells 110 to the load device 120. In other words, the second power module 140 is not in use when the first power module 130 is in use. On the other hand, the second power module 140 electrically connects the battery cells 110 to the load device 120 when the first power module 130 does not electrically connect the battery cells 110 to the load device 120. In other words, the second power module 140 is in use when the first power module 130 is not in use (e.g., in the event of a battery cell failure, a circuitry failure, etc.). In some embodiments, the first power module 130 can be referred to as a primary power module, and the second power module 140 can be referred to as a secondary power module.

Particularly, as an example, the power supply system 100 can be part of an implantable ventricular assist device (VAD) system, which includes an implantable blood pump (i.e., load device 120), an internal controller (i.e., the first power module 130 and the second power module 140), a rechargeable internal battery (i.e., battery cells 110), and a transcutaneous energy transmission (TET) system including an implantable power receiver and an external power transmitter (i.e., power source 150). In some embodiments, the external power transmitter (e.g., an inductive coil) can provide power to the implantable blood pump via the implantable power receiver (e.g., a second inductive coil). More specifically, the external power transmitter can be inductively coupled to the implantable power receiver such that power is transferred from the external power transmitter to the implantable power receiver. In some embodiments, the TET system can be a primary power source for the implantable blood pump and the internal battery can be a secondary or backup power source. More specifically, the internal battery can provide power to the implantable blood pump when the TET system does not provide power to the implantable blood pump (e.g., the external power transmitter is not aligned and/or is not in physical proximity to the implantable power receiver. Alternatively, the TET system can be a secondary power source such that when the internal battery does not have sufficient power to drive the implantable blood pump, the TET system can be used to transfer power from the external power transmitter to the implantable blood pump via the implantable power receiver. In addition, the TET system can be used to recharge the internal battery.

FIG. 2 is a schematic illustration of a power supply system 200, according to another embodiment. The power supply system 200 can include a first power module 230, a second power module 240, and a set of battery cells 210. Similar to the first power module 130, the second power module 140, and the battery cells 110 in FIG. 1, the first power module 230 can be operatively coupled to the battery cells 210 and the second power module 240. The second power module 240 can also be operatively coupled to the battery cells 210. Additionally, a load device (not shown in FIG. 2) can be coupled to the lust power module 230 through electrodes $E_1$ and $E_2$, and/or the second power module 240 through electrodes $E_1$ and $E_3$. The voltages measured at electrodes $E_1$, $E_2$, and $E_3$ are voltage $V_1$, $V_2$, and $V_3$, respectively, as shown in FIG. 2.

The battery cells 210 can consist of multiple battery cells (as shown by battery cells $B_1$-$B_4$) electrically coupled in series. More specifically, as shown in FIG. 2, battery cell $B_1$'s negative electrode is coupled to battery cell $B_2$'s positive electrode; battery cell $B_2$'s negative electrode is coupled to battery cell $B_3$'s positive electrode; and battery cell $B_3$'s negative electrode is coupled to battery cell $B_4$'s positive electrode. With such a configuration, the voltage at the positive electrode of battery cell $B_1$ is the sum of the output voltage of the battery cells $B_1$-$B_4$, when each of the battery cells $B_1$-$B_4$ is in a normal operational state. For example, if the battery cells $B_1$-$B_4$ are HCT14500 Li-ion rechargeable batteries, which produce a nominal voltage of 3.7 V, then the output voltage of the battery cells 210, measured at the positive electrode of battery cell $B_1$, is approximately 14.8 V.

As shown in FIG. 2, the first power module 230 can include a control module 235. In some embodiments, the control module 235 can include hardware, firmware, and/or software (executing in hardware) that can provide safety protection for the power supply system 200. Additionally, the control module 235 can provide protection to a load device (not shown in FIG. 2) that is driven by the power supply system 200. For example, the control module 235 can include a battery gas gauge device (e.g., Texas Instruments' bq20z90) and an analog front end (AFE) for battery protection (e.g., Texas Instruments' bq29330), which can be used to provide safety protection for overload, short circuit in charge/discharge, battery overvoltage/undervoltage, etc. Such a control module includes at least a processor and a memory portion. For example, Texas Instruments' bq29330 includes a processor and a ROM, a RAM, a program flash memory, and a data flash memory.

The first power module 230 can also include other peripheral circuitry that can electrically couple the control module 235 with other parts of the power supply system 200. Specifically, the control module 235 can be electrically coupled to each of the battery cells $B_1$-$B_4$, and a boost circuit 245 that is part of the second power module 240. The control module 235 can also be electrically coupled to electrodes $E_1$ and $E_2$, through which power can be supplied to a load device (not shown in FIG. 2) from the first power module 230.

In the embodiment illustrated in FIG. 2, the control module 235 can be electrically coupled with the positive electrode and negative electrode of each of the battery cells $B_1$-$B_4$. This configuration can enable the control module 235 to detect a battery cell failure at any of the battery cells $B_1$-$B_4$. In some embodiments, the control module 235 can detect a battery cell failure by monitoring the output voltage of each of the battery cells $B_1$-$B_4$. For example, if battery cell $B_1$ fails, the control module 235 can detect that the output voltage of battery cell $B_1$ has changed from an amount within an operational voltage range (e.g., a range around 3.7 V for a HCT14500 Li-ion rechargeable battery) to an amount outside the operational voltage range. In some embodiments, the control module 235 can also detect the type of failure that has occurred to a battery cell. For example, the control module 235 can detect that the battery cell $B_1$ has failed such that it functions as an open circuit, or has failed such that it functions as a short circuit.

In the event that a battery cell failure is detected by the control module 235, the control module 235 can trigger a protection mechanism to protect the power supply system 200 and the load device (not shown in FIG. 2) that is coupled to the power supply system 200. In the embodiment illustrated in FIG. 2, the control module 235 can send a signal to a switch S to disconnect the electrode $E_2$ from the battery cells 210. As a result of the switch S disconnecting the electrode $E_2$ from the battery cells, the first power module 230 does not supply power to the electrode $E_2$. Similarly stated, the control module 235 can shut down the first power module 230 such that no output voltage is produced by the first power module 230.

In the embodiment illustrated in FIG. 2, the second power module 240 includes a diode OR circuit 250 and a boost circuit 245. The diode OR circuit 250 consists of five diodes $D_1$-$D_5$, which connect the battery cells 210 with the boost circuit 245. The diode OR circuit 250 can be used to derive an output voltage from the battery cells 210, which functions as an input to the boost circuit 245. That is, the output voltage of the diode OR circuit 250 (measured at the cathode of diodes $B_1$-$D_4$) is maintained at a level equal to the input voltage (i.e., the highest voltage at the anode of diodes $D_1$-$D_4$) produced by the battery cells 210. In other words, the diode OR circuit 250 can produce an output voltage at the cathode of diodes $D_1$-$D_4$ that is equal to the highest voltage at the positive electrode of battery cells $B_1$-$B_4$. For example, if HCT14500 Li-ion rechargeable batteries are used as battery cells $B_1$-$B_4$ and the battery cells $B_1$-$B_4$ are in a normal operational state with a voltage of approximately 3.7 V, then the output voltage produced by the diode OR circuit 250 can be approximately equal to the voltage at the positive electrode of battery cell $B_1$, which is the sum of the output voltage of battery cells $B_1$-$B_4$. In this example, the output voltage produced at the diode OR circuit can be approximately 14.8 V. In such embodiments, the highest voltage at the positive electrode of battery cells $B_1$-$B_4$ equals to the sum of the output voltage of battery cells $B_1$-$B_4$, regardless of the operational state of the battery cells $B_1$-$B_4$. Particularly, when one or more of the battery cells $B_1$-$B_4$ are not producing an output voltage (e.g., in the event of a battery cell failure), the diode OR circuit 250 can still produce an output voltage that is substantially equal to the sum of the voltage produced by the remaining functional battery cells. For example, if the battery cell $B_1$ fails to produce any output voltage, the diode OR circuit 250 can still produce an output voltage of approximately 11.1 V, substantially equal to the voltage at the positive electrode of battery cell $B_2$, which is the sum of the output voltage from the remaining functional battery cells $B_2$-$B_4$.

As shown in FIG. 2, the boost circuit 245 can be electrically coupled with the diode OR circuit 250. The boost circuit 245 can also be electrically coupled with the control module 235 of the first power module 230 through the switch S. The boost circuit 245 can be a boost controller device (e.g., Texas Instruments' TPS40210) that can convert an input voltage supplied from the diode OR circuit 250 to a greater output voltage. The output voltage of the boost circuit 245 can be provided to a load device through electrodes $E_3$ and $E_1$. For example, the boost circuit 245 can convert an input voltage of 11.1 V supplied by the diode OR circuit 250 to an output voltage of 14.8 V and provide the output voltage to a load device through electrodes $E_3$ and $E_1$ (i.e., $V_3$-$V_1$). In some embodiments, the boost circuit 245 can provide an output voltage that is substantially equal to the input voltage. For example, the boost circuit 245 can provide an output voltage substantially equal to an input voltage of 14.8 V that is supplied from four functional HCT14500 Li-ion rechargeable batteries. In such embodiments, the boost function of the boost circuit 245 is not used.

In some embodiments, the operation of the boost circuit 245 can be controlled by the operational state of the first power module 230. Specifically, when the first power module 230 is in a normal operational state (e.g., the output voltage $V_2$-$V_1$ is within an operational voltage range), the boost circuit 245 is configured to be inactive. Accordingly, substantially no output voltage is produced from the boost circuit 245 (i.e., voltage $V_3$-$V_1$ is substantially zero). When the first power module 230 is not in the normal operational state (e.g., the output voltage $V_2$-$V_1$ is outside the operational voltage range), the boost circuit 245 is configured to be active. Accordingly, an output voltage $V_3$-$V_1$ is produced from the boost circuit 245 (i.e., voltage $V_3$-$V_1$ is greater than zero).

The operational state of the first power module 230 can be determined by various factors. In some embodiments, the power supplied from the battery cells 210 to the first power module 230 can drop due to a battery cell failure and/or a discharge operation. As a result, the output voltage $V_2$-$V_1$ of the first power module 230 can drop from an amount within the operational range to an amount below the operational range. In some other embodiments, in the event of a failure at the battery cells 210 (e.g., a battery cell failure) and/or at the first power module 230 (e.g., a circuitry failure), the electrode $E_2$ can be disconnected from the battery cells 210, and/or the first power module 230 can be inactivated or shut down. As a result, the output voltage $V_2$-$V_1$ can change from an amount within the operational range to substantially zero. In some other embodiments, a circuitry failure in the control module 235 can cause the first power module 230 to function abnormally, causing the output voltage $V_2$-$V_1$ to change from an amount within the operational range to an amount outside the operational range. In such embodiments, the battery cells 210 can still be in a normal operational state, but the first power module 230 can electrically decouple the electrode $E_2$, from the battery cells 210.

In the embodiment illustrated in FIG. 2, the boost circuit 245 can be electrically coupled to the electrode $E_2$ and can monitor the output voltage $V_2$-$V_1$ of the first power module 230. As described herein, in the event of a discharge operation, a battery cell failure at the battery cells 210, and/or a circuitry failure at the first power module 230, the output voltage $V_2$-$V_1$ can drop from an amount within the operational range to an amount below the operational range. The boost circuit 245 can detect such a change in the output voltage $V_2$-$V$, (i.e., by monitoring electrode $E_2$), and as a result, the boost circuit 245 can be activated.

In another embodiment, upon detecting that the output voltage $V_2$-$V_1$ of the first power module 230 has changed from an amount within the operational range to an amount outside the operational range, the control module 235 can send a signal to the switch S to disconnect the electrode $E_2$ from the battery cells 210. The control module 235 can also actively send a signal to the boost circuit 245 to activate the boost circuit 245. In still another embodiment, upon a person (e.g., a device operator) detecting that the output voltage of the first power module 230 has changed from an amount within the operational range to an amount outside the operational range, the person can manually disconnect electrode $E_2$ from the battery cells 210, and/or manually inactivate or shut down the first power module 230. The person can also manually activate the boost circuit 245.

After the boost circuit 245 is activated, the output voltage of the boost circuit 245 (i.e., $V_3$-$V_1$) can be supplied to the load device (not shown in FIG. 2) through electrodes $E_3$ and $E_1$. In some embodiments, the load device can be electrically connected to the electrode $E_3$ after it is disconnected from the electrode $E_2$.

Figure 3:
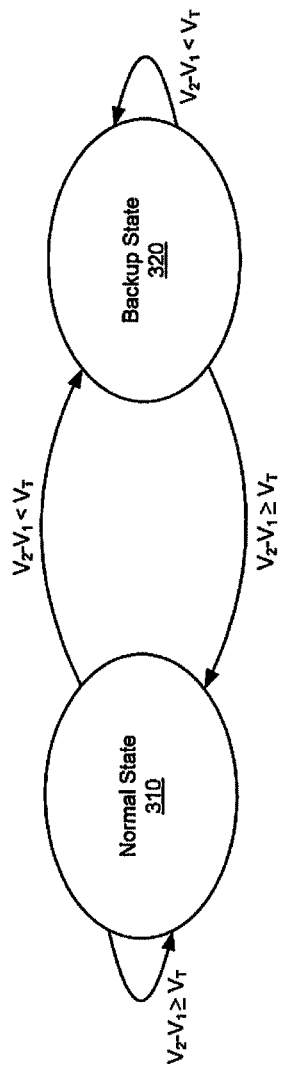
FIG. 3 is a state transition diagram illustrating operation states of the power supply system of FIG. 2.

FIG. 3 is a state transition diagram illustrating operational states of the power supply system 200 in FIG. 2. In some embodiments, the power supply system 200 can be in one of two operational states: a normal state 310 and a backup state 320. The operational state of the power supply system 200 can be determined by the output voltage of the first power module 230, $V_2$-$V_1$. Specifically, the power supply system 200 is in the normal state 310 when the output voltage $V_2$-$V_1$ is within a predetermined operational range. The power supply system 200 is in the backup state 320 when the output voltage $V_2$-$V_1$ is outside the operational range. Furthermore, when the output voltage $V_2$-$V_1$ changes from an amount within the operational range to an amount outside the operational range, the power supply system 200 can change from the normal state 310 to the backup state 320. Similarly, when the output voltage $V_2$-$V_1$ changes from an amount outside the operational range to an amount within the operational range, the power supply system 200 can change from the backup state 320 back to the normal state 310.

For example, as illustrated in FIG. 3, the operational range for the output voltage $V_2$-$V_1$ can be defined as any voltage equal to or greater than a predetermined threshold voltage $V_T$. Therefore, when the output voltage $V_2$-$V_1$ is equal to or greater than the threshold voltage $V_T$, the power supply system 200 remains in the normal state 310. Specifically, the first power module 230 supplies the output voltage $V_2$-$V_1$ to a load device through electrodes $E_2$ and $E_1$ when the power supply system 200 is in the normal state 310. Meanwhile, the boost circuit 245 of the second power module 240 is not activated and therefore does not provide an output voltage to the load device when the power supply system 200 is in the normal state 310.

When the output voltage $V_2$-$V_1$ drops to an amount lower than the threshold voltage $V_T$ due to a change in the battery cells 210 (e.g., a battery cell failure, a discharge operation) and/or in the first power module 230 (e.g., a circuitry failure), the power supply system 200 transitions from the normal state 310 to the backup state 320. For example, if one of the battery cells $B_1$-$B_4$ fails, or the battery cells 210 has discharged for a long period of time (e.g., three days, one week), the output voltage $V_2$-$V_1$ can drop below the threshold voltage $V_T$. For another example, if the electrode $E_2$ is disconnected from the battery cells 210, and/or the first power module 230 is inactivated or shut down, the output voltage $V_2$-$V_1$ can drop below the threshold voltage $V_T$. When the output voltage $V_2$-$V_1$ drops to an amount lower than the threshold voltage $V_T$, the boost circuit 245 of the second power module 240 is activated and provides a backup output voltage $V_3$-$V_1$ to the load device through electrodes $E_3$ and $E_1$. Furthermore, as long as the output voltage $V_2$-$V_1$ remains lower than the threshold voltage $V_T$, the power supply system 200 remains in the backup state 320. That is, the boost circuit 245 remains active, supplying the backup output voltage $V_3$-$V_1$ to the load device.

In some embodiments, the power supply system 200 can also transition from the backup state 320 to the normal state 310. As shown in FIG. 3, when the first power module 230 and/or the battery cells 210 change back to a normal operational state (e.g., a failed circuitry is repaired, a failed battery cell is replaced, a pack of rechargeable battery cells are recharged, etc.), the first power module 230 can supply power to the load device. In some embodiments, such a transition can be executed automatically as a result of the change of the operational state of the first power module 230. For example, after a failed battery cell is replaced with a functional battery cell, the control module 235 can detect that the battery cells 210 have returned back to a normal operational state (e.g., the battery cells 210 provide an output voltage within the operational voltage range). For another example, after a pack of rechargeable battery cells are recharged to a voltage such that the output voltage of the battery cells 210 reaches the threshold voltage $V_T$, the control module 235 can detect that the battery cells 210 have returned back to a normal operational state. As a result, the control module 235 can send a signal to the switch S to reconnect electrode $E_2$ with the battery cells 210. As such, an output voltage $V_2$-$V_1$ higher than the threshold voltage $V_T$ can be produced from the first power module 230. Meanwhile, the boost circuit 245 can detect the change in the output voltage $V_2$-$V_1$. As a result, the boost circuit 245 can be inactivated and stop supplying voltage to the electrode $E_3$. Similarly stated, the output voltage $V_3$-$V_1$ can be substantially zero.

In some other embodiments, such a transition can be executed manually by a human operator. For example, after a failed battery cell is replaced with a functional battery cell by a human operator, the human operator can manually inactivate the boost circuit 245 and activate the first power module 230, so that the power supply system 200 can change from the backup state 320 back to the normal state 310.

Figure 4:
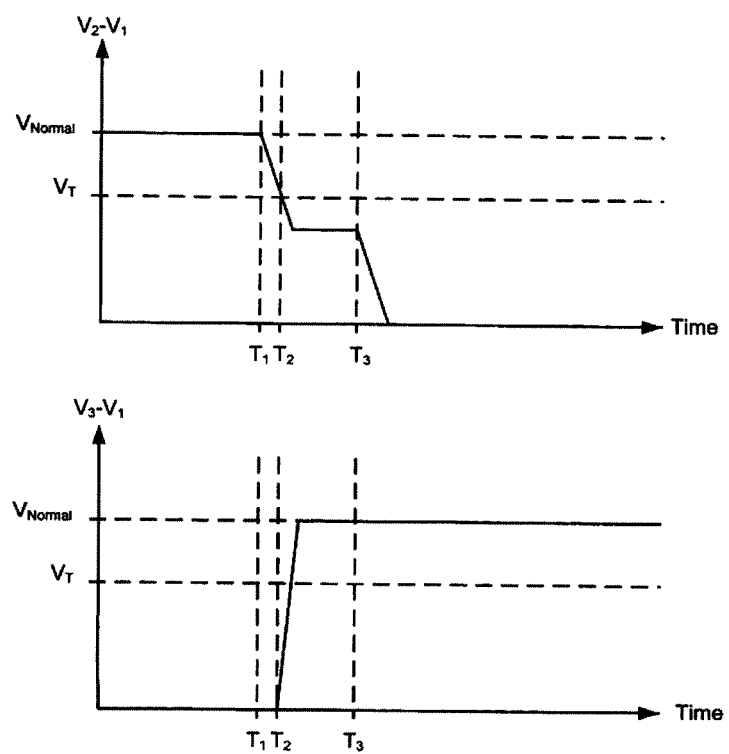
FIG. 4 illustrates the output voltages of the power supply system of FIG. 2.

FIG. 4 illustrates the output voltages of the power supply system 200 described in FIG. 2 and FIG. 3. Specifically, FIG. 4 illustrates an example of how the output voltage of the first power module 230 (i.e., $V_2$-$V_1$) and the output voltage of the second power module 240 (i.e., $V_3$-$V_1$) change when the power supply system 200 transitions from the normal state 310 to the backup state 320. As shown in FIG. 4, before time $T_1$, the power supply system 200 is in the normal state 310. The output voltage $V_2$-$V_1$ is substantially equal to a voltage $V_{Normal}$ that is greater than the threshold voltage $V_T$. Additionally, the output voltage $V_3$-$V_1$ is substantially equal to zero. At time $T_1$, a failure occurs at the battery cells 210 (e.g., a battery cell failure) and/or at the first power module 230 (e.g., a circuitry failure). As a result, the output voltage $V_2$-$V_1$ starts to drop. At time $T_2$, the output voltage $V_2$-$V_1$ drops below the threshold voltage $V_T$, which activates the boost circuit 245. Upon activation of the boost circuit 245, the output voltage $V_3$-$V_1$ increases. After the output voltage $V_3$-$V_1$ reaches the voltage $V_{Normal}$, the boost circuit 245 is stabilized and the output voltage $V_3$-$V_1$ remains substantially equal to $V_{Normal}$. On the other hand, the first power module 230 reaches a temporal stable state when the output voltage $V_2$-$V_1$ drops to a certain level lower than the threshold voltage $V_T$. The output voltage $V_2$-$V_1$ can remain at that level temporarily. The control module 235 can detect the failure, and respond accordingly. As described herein, in some embodiments, the control module 235 can send a signal to the switch S to disconnect electrode $E_2$ from the battery cells 210. Additionally, the control module 235 can also inactivate or shut down the first power module 230. After a short period of time, at time $T_3$ electrode $E_2$ is disconnected from the battery cells 210, and/or the first power module 230 is inactivated or shut down. As a result, the output voltage $V_2$-$V_1$ drops to substantially zero, and the second power module 240 starts to supply power to the load device through electrodes $E_1$ and $E_3$. Accordingly, the power supply system 200 enters the backup state 320.

Figure 5:
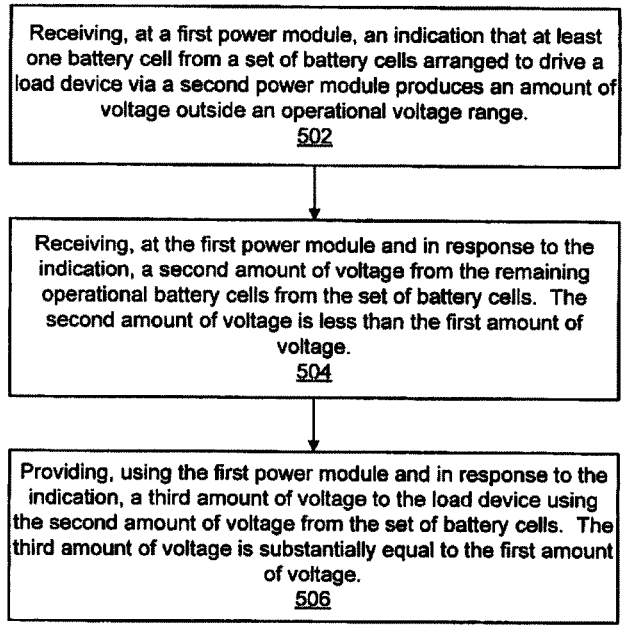
FIG. 5 is a flow chart illustrating a method of utilizing a power module of a power supply system when an amount of voltage produced by a set of battery cells is outside an operational voltage range, according to an embodiment.

FIG. 5 is a flow chart illustrating a method of utilizing a power module (e.g., power module 240 in FIG. 2) of a power supply system (e.g., power supply system 200 in FIG. 2) when an amount of voltage produced by a set of battery cells is outside an operational voltage range, according to an embodiment. At 502, the first power module can receive an indication that at least one battery cell from a set of battery cells arranged to drive a load device via the second power module produces an amount of voltage outside an operational voltage range. The second power module can be configured to provide a first amount of voltage to the load device when each battery cell from the set of battery cells produces an amount of voltage within the operational voltage range. For example, as described in detail with respect to FIG. 2-FIG. 4, the battery cells 210 can be configured to drive a load device via the power module 230. When each of the battery cells $B_1$-$B_4$ produces an amount of voltage above a certain level, the power module 230 can be configured to provide an output voltage (i.e., $V_2$-$V_1$) above a threshold voltage $V_T$ to the load device (e.g., as shown by $V_{Normal}$ in FIG. 4). In the event that the battery cells $B_1$-$B_4$ have discharged for a long period of time, or at least one of the battery cells $B_1$-$B_4$ fails, the output voltage $V_2$-$V_1$ of the power module 230 drops below the threshold voltage $V_T$. The boost circuit 245 of power module 240 can receive such an indication by monitoring the output voltage $V_2$-$V_1$ of the power module 230.

At 504, in response to the indication, the first power module can receive a second amount of voltage from the remaining operational battery cells from the set of battery cells. The second amount of voltage is less than the first amount of voltage. For example, as described in detail with respect to FIG. 2-FIG. 4, the boost circuit 245 of the power module 240 can receive the indication that the output voltage $V_2$-$V_1$ of the power module 230 has dropped below the threshold voltage $V_T$. In response to the indication, the boost circuit 245 can be activated. As a result, the boost circuit 245 can receive a voltage supplied by the remaining functional battery cells of $B_1$-$B_4$ through the diode OR circuit 250. Such a voltage is below the threshold voltage $V_T$, therefore less than the voltage $V_2$-$V_1$ provided by the power module 230 to the load device when each of the battery cells $B_1$-$B_4$ functions properly (e.g., $V_{Normal}$).

At 506, in response to the indication, the first power module can provide a third amount of voltage to the load device using the second amount of voltage from the set of battery cells. The third amount of voltage is substantially equal to the first amount of voltage. For example, as described in detail with respect to FIG. 2-FIG. 4, in response to the indication that the output voltage $V_2$-$V_1$ of the power module 230 has dropped below the threshold voltage $V_T$, the boost circuit 245 of the power module 240 can be activated. As a result, the boost circuit 245 can convert the voltage provided by the remaining functional battery cells of $B_1$-$B_4$ to an output voltage $V_3$-$V_1$. The output voltage $V_3$-$V_1$ can be substantially equal to the voltage $V_2$-$V_1$ provided by the power module 230 to the load device when each of the battery cells $B_1$-$B_4$ functions properly (e.g., $V_{Normal}$). Meanwhile, the control module 235 of the power module 230 can be configured to disconnect electrode $E_2$ from the battery cells 210, and/or inactivate or shut down the power module 230. The power module 240 can be used to provide the output voltage $V_3$-$V_1$ to the load device.

Figure 6:
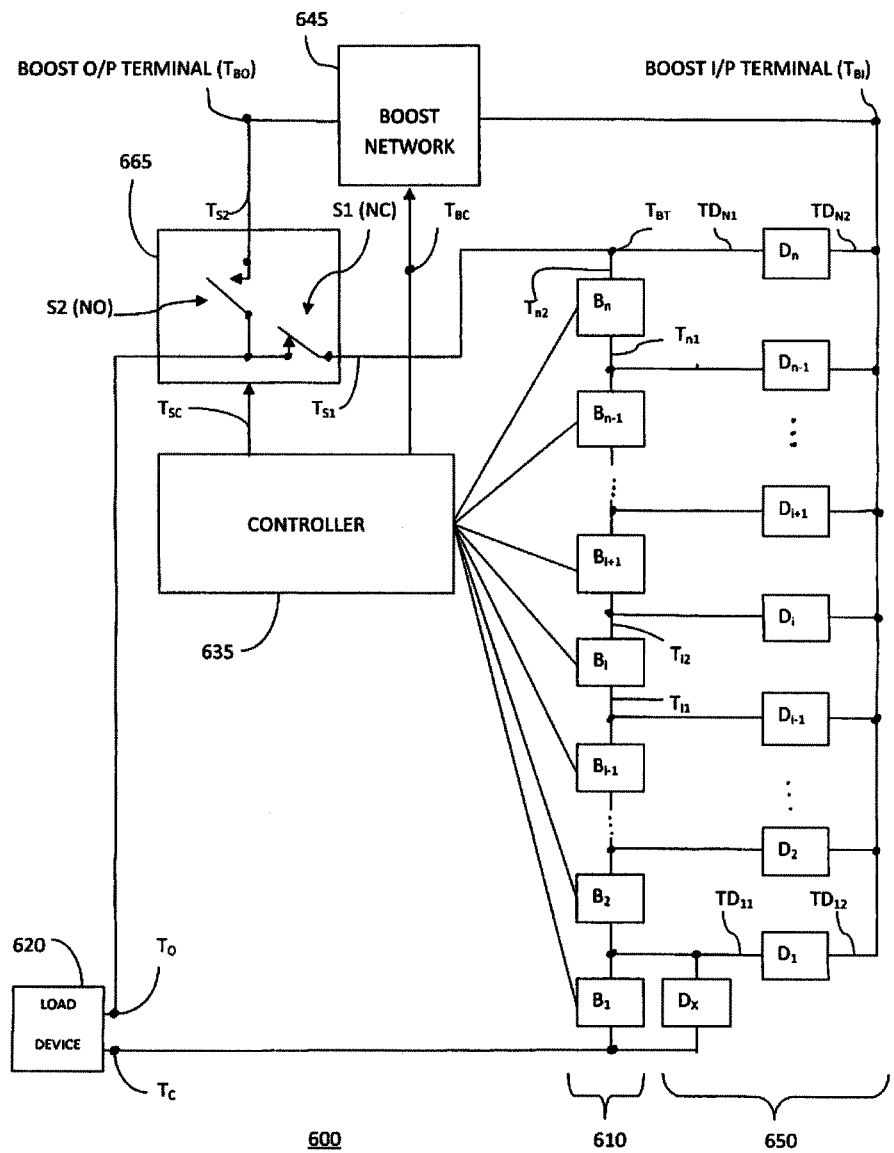
FIG. 6 is a system block diagram of another power supply system, according to an embodiment.

In another embodiment shown in FIG. 6, a fault tolerant power supply system 600 is shown for maintaining a substantially constant voltage $V_O$ across an output terminal $T_O$ and a common terminal $T_C$. A load device 620 is coupled across terminal $T_O$ and terminal $T_C$. The power supply system 600 comprises a battery cell module 610 including n series-connected batteries $B_1$-$B_n$, a controller 635 and a boost network 645. The n batteries are coupled to an input terminal $T_{BI}$ of the boost network 645 by a diode-OR network 650. The n batteries are coupled in series between a first battery terminal $T_{BT}$ and the common terminal $T_C$. The $i^{th}$ battery $B_i$ establishes a voltage $V_i$ across a first terminal thereof $T_{i1}$ and a second terminal thereof $T_{i2}$, wherein $1 \leq i \leq n$.

For battery $B_1$, terminal $T_{i,1}$ is coupled to common terminal $T_C$. For battery $B_n$, terminal $T_{n,2}$ is coupled to a battery terminal $T_{BT}$. For battery $B_i$, terminal $T_{i,1}$ is coupled to terminal $T_{i-1,2}$, where $1<i<n$. For battery $B_i$, terminal $T_{i,2}$ is coupled to terminal $T_{i+1,1}$, where $1 \leq i \leq n$, the $i^{th}$ battery $B_i$ is characterized by a voltage $V_i$, wherein $1 \leq i \leq n$, and the sum of $V_i$ equals $V_O$ when all batteries are in an operative condition. The boost network 645 is coupled between a boost input terminal $T_{BI}$ and a boost output terminal $T_{BO}$. Terminal $T_{BI}$ is coupled to at least one of the n batteries. The boost network 645 includes a boost circuit responsive to an activation signal representative of a detected battery fault applied to a boost control terminal $T_{BC}$ thereof, to establish a voltage substantially equal to $V_B+V_S$ at terminal $T_{BO}$, relative to the potential at terminal $T_C$, wherein $V_S$ equals the sum of voltages across the n batteries coupled to terminal $T_{B1}$, and $V_B$ is a boost voltage $V_B$ substantially equal to $V_O$-$V_S$. By way of example, the boost network is a Type TPS40210 or TPS40211 4.5-V to 52-V Input Current Boost Mode Controller manufactured by Texas instruments.

The diode-OR network 650 includes n diodes and a base diode. For the n diodes, the $i^{th}$ diode $D_i$ has a first terminal $TD_{i,1}$, and a second terminal $TD_{i,2}$, wherein $1 \leq i \leq n$, and wherein for each diode $D_i$, first terminal $TD_{i,1}$ is coupled to terminal $T_{i,1}$, and second terminal $TD_{i,2}$ is coupled to a boost input terminal $T_{BI}$. The base diode $D_x$ has a first terminal $TD_{x,1}$ and a second terminal $TD_{x,2}$, wherein first terminal $TD_{x,1}$ is coupled to terminal $T_{1,1}$ and second terminal $TD_{x,2}$ is coupled to terminal $T_{1,2}$.

The controller 635 is adapted to detect whether at least one of the n batteries is in an operative condition or in an inoperative condition. The monitoring of the respective batteries is indicated in FIG. 6 by the dash lines between the controller 635 and the respective diodes $D_i$. In response to detection of all n batteries being in an operative condition, the controller 635 couples the voltage at terminal $T_{BT}$ to terminal $T_O$. In response to detection of at least one of the n batteries being in an inoperative condition. The controller 635 generates an activation signal representative of a detected battery fault and applies the activation signal representative of a detected battery fault to the boost control terminal $T_{BC}$, and thereupon couples the voltage at terminal $T_{BO}$ to terminal $T_O$, and isolates the voltage at terminal $T_{BT}$ from terminal $T_O$. In the form illustrated in FIG. 6, all of the n batteries are coupled to terminal $T_{BT}$, and terminal $T_{B1}$ is coupled to the n batteries by way of the diode-OR circuit 650.

The voltages at terminals $T_{BI}$ and terminal $T_{BT}$ are selectively coupled to the output terminal $T_O$ by a switch network 665, which includes two switches, normally closed (NC) switch S1 and normally open (NO) switch S2. The switch network 665 has a battery input terminal $T_{S1}$ coupled to $T_{BT}$, a boost input terminal $T_{S2}$ coupled to terminal $T_{BO}$, and a switch control terminal $T_{SC}$. The normally closed (NC) toggle switch S1 is coupled between terminal $T_{S1}$ and terminal $T_O$. The second, normally open (NO) toggle switch S2 is coupled between terminal $T_{S2}$ and terminal $T_O$.

The controller 635 is adapted to detect whether at least one of said n batteries is in an operative condition or in an inoperative condition. In response to detection by controller 635 of all n batteries being in an operative condition, the controller 635 generates an activation signal representative of no detected battery fault and applies that "no detected battery fault" activation signal to the switch control terminal $T_{SC}$. In response to that "no detected battery fault" activation signal, switch S2 is controlled to be in its normally open (NO) state thereby isolating the voltage at terminal $T_{BO}$ from terminal $T_O$ and switch S1 is controlled to be in its normally closed (NC) state thereby coupling the voltage at terminal $T_{BT}$ to terminal $T_O$.

In response to detection by controller 635 of at least one of said n batteries being in an inoperative condition, the controller 635 generates an activation signal representative of a "detected battery fault" and applies that "detected battery fault" activation signal to the boost control terminal $T_{BC}$ and the switch control terminal $T_{SC}$. In response to that "detected battery fault" activation signal, switch S1 is controlled to be in its open state thereby isolating the voltage at terminal $T_{BT}$ from terminal $T_O$, and switch S2 is controlled to be in its closed state thereby coupling the voltage at terminal $T_{BO}$ to terminal $T_O$.

In one form of the fault tolerant power supply:
(i) terminals $T_{i,1}$ are all anodes for batteries $B_i$,
(ii) terminals $T_{i,2}$ are all cathodes for batteries $B_i$,
(iii) terminals $TD_{i,1}$ are all anodes for diodes $D_i$
(iv) terminals $TD_{1,2}$ are all cathodes for diodes $D_i$,
(v) terminal $TD_{x,1}$ is an anode for diode $D_x$, and
(vi) terminal $TD_{x,2}$ is a cathode for diode $D_x$.

In another form of the fault tolerant power supply:
(i) terminals $T_{i,1}$ are all cathodes for batteries $B_i$
(ii) terminals $T_{i,2}$ are all anodes for batteries $B_i$,
(iii) terminals $TD_{i,1}$ are all cathodes for diodes $D_i$
(iv) terminals $TD_{i,2}$ are all anodes for diodes $D_i$,
(v) terminal $TD_{x,1}$ is a cathode for diode $D_x$, and
(vi) terminal $TD_{x,2}$ is an anode for diode $D_x$.

While shown and described above with respect to FIG. 2 as the second power module 240 including a diode OR circuit 250, in other embodiments, other types of logic circuits can be used to derive a voltage from the battery cells 210 and provide the voltage to the boost circuit 245. For example, other types of logic circuits can function as an OR logic gate to produce an output voltage that equals to the highest voltage at the positive electrode of battery cells $B_1$-$B_4$. For example, such an OR logic gate can be a RTL (resistor-transistor logic) OR gate, a DTL (diode-transistor logic) OR gate, or a CMOS (complementary metal-oxide-semiconductor logic) OR gate, etc. In other embodiments, suitable circuitry, other than art OR logic gate can be used.

While shown and described above with respect to FIG. 4 as the second power module 240 starting to supply power to the load device from time $T_3$, in other embodiments, the transition from the first power module 230 to the second power module 240 can occur at another time. In some embodiments, for example, as soon as the output voltage $V_2$-$V_1$ of the first power module 230 drops below the threshold voltage $V_T$ (i.e., at time $T_2$ in FIG. 4), the load device can be disconnected from electrode $E_2$ of the first power module 230 and connected to electrode $E_3$ of the second power module 240. In yet other embodiments, for example, the transition can occur as soon as the output voltage $V_3$-$V_1$ of the second power module 240 reaches $V_{Normal}$ (i.e., sometime between time $T_2$ and time $T_3$ in FIG. 4).

While shown and described above with respect to FIG. 2 as the power supply system 200 including two power modules (i.e., a first power module 230, a second power module 240), in other embodiments, a power supply system can include more than two power modules. Similarly, depending on the scale of the implementation, a power supply system can include more than one control module, more than one diode OR circuit, more than one boost circuit, more or less than four battery cells, and/or more than one load device, etc. In some embodiments, for example, a power supply system can consist of a number of sub-power supply systems. Each sub-power supply system can include various numbers of power modules that operate on various numbers of battery cells. The output voltages of the sub-power supply systems can be combined to provide power to one or more load devices.

As described herein, the control module 235 (FIG. 2), the boost circuit 245 (FIG. 2) and/or other portions of the power supply systems described herein can include hardware, firmware, and/or software (executing in hardware). For example, some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. Where methods described above indicate certain events occurring in certain order, the ordering of certain events may be modified. Additionally, certain of the events may be performed concurrently in a parallel process when possible, as well as performed sequentially as described above

What is claimed is:
1. A system, comprising:
a first power module configured to be electrically coupled to a plurality of battery cells that produces a first amount of voltage when in a first operational state and a second amount of voltage less than the first amount of voltage when in a second operational state, the first power module configured to provide a third amount of voltage to a load device by electrically coupling the plurality of battery cells to the load device when the plurality of battery cells is in the first operational state, the third amount of voltage is substantially equal to the first amount of voltage; and a second power module configured to be electrically coupled to the plurality of battery cells such that the second power module is configured to provide a fourth amount of voltage to the load device by electrically coupling the plurality of battery cells to the load device when the plurality of battery cells is in the second operational state, the fourth amount of voltage is substantially equal to the first amount of voltage, wherein when the plurality of battery cells is in the second operational state and at least one battery cell of any of the plurality of battery cells produces an amount of voltage less than a voltage threshold, the second amount of voltage is subject to vary at least in accordance with a quantity of the at least one battery cell whose amount of voltage is less than the voltage threshold, wherein the second power module is configured to provide the fourth amount of voltage to the load device notwithstanding variation in the quantity of the at least one battery cell whose amount of voltage is less than the voltage threshold.

2. The system of claim 1, wherein the first power module does not electrically couple the plurality of battery cells to the load device when the plurality of battery cells is in the second operational state.

3. The system of claim 1, wherein each battery cell from the plurality of battery cells produces an amount of voltage greater than a voltage threshold when the plurality of battery cells is in the first operational state.

4. The system of claim 1, wherein the second power module monitors an output voltage of the first power module to determine when the plurality of battery cells has changed from the first operational state to the second operational state.

5. The system of claim 1, wherein the second power module includes a diode OR circuit and a voltage boost circuit.

6. The system of claim 1, wherein the second power module does not supply the fourth amount of voltage to the load device when the plurality of battery cells is in the first operational state.

7. The system of claim 1, wherein each battery cell from the plurality of battery cells is electrically coupled in series with the remaining battery cells from the plurality of battery cells when the plurality of battery cells is in the first operational state.

8. A method, comprising, receiving, at a first power module, an indication that at least one battery cell of any of a plurality of battery cells arranged to drive a load device via a second power module produces an amount of voltage outside an operational voltage range, the second power module configured to provide a first amount of voltage to the load device when each battery cell from the plurality of battery cells produces an amount of voltage within the operational voltage range;

receiving, at the first power module a second amount of voltage from the plurality of battery cells when the at least one battery cell produces the amount of voltage outside the operational range, the second amount of voltage being subject to vary at least in accordance with a quantity of the at least one battery cell whose amount of voltage is outside the operational voltage range, the second amount of voltage being less than the first amount of voltage; and providing, using the first power module and in response to the indication, a third amount of voltage to the load device using the second amount of voltage from the plurality of battery cells, the third amount of voltage being substantially equal to the first amount voltage, notwithstanding variation in the quantity of the at least one battery cell whose amount of voltage is outside the operational voltage range.

9. The method of claim 8, wherein the second power module is configured to provide a fourth amount of voltage to a load device when the at least one battery cell from the plurality of battery cells produces the amount of voltage outside the operational voltage range, the fourth amount of voltage being substantially equal to zero.

10. The method of claim 8, wherein the first power module includes a diode OR circuit and a voltage boost circuit.

11. The method of claim 8, further comprising:

determining, in response to the indication, whether an output voltage of the second module is less than a predetermined voltage threshold.

12. The method of claim 8, wherein each battery cell from the plurality of battery cells is electrically coupled in series with the remaining battery cells from the plurality of battery cells.

13. An apparatus, comprising:

a secondary power module electrically coupled to a primary power module that is configured to provide a load device with a first amount of voltage when each battery cell from a plurality of battery cells coupled to the primary power module produces an amount of voltage within an operational voltage range, the secondary power module configured to provide a second amount of voltage to the load device when at least one battery cell from any of the plurality of battery cells produces an amount of voltage outside the operational voltage range, the secondary power module configured to provide the second amount of voltage using a third amount of voltage received at the secondary power module from the plurality of battery cells, the second amount of voltage being substantially equal to the first amount of voltage, the third amount of voltage being less than the first amount of voltage and the second amount of voltage, wherein each battery cell from the plurality of battery cells is electrically coupled in series with the remaining battery cells from the plurality of battery cells, and the apparatus includes an OR circuit comprising a plurality of devices, each device coupled between a common node and one of the electrodes of a respective battery cell of the plurality of battery cells, the OR circuit configured to output at the common node the first amount of voltage when each of the plurality of battery cells produces the amount of voltage within the operational voltage range, and the OR circuit configured to output at the common node the third amount of voltage when the at least one battery cell produces the amount of voltage outside the operational voltage range, wherein the third amount of voltage is subject to vary at least in accordance with a quantity of the at least one battery cell whose amount of voltage is outside the operational voltage range.

14. The apparatus of claim 13, wherein the primary power module is configured to provide substantially no voltage to the load device when the at least one battery cell from the plurality of battery cells is not operational.

15. The apparatus of claim 13, wherein the secondary power module is configured to provide substantially no voltage to the load device when each battery cell from the plurality of battery cells is operational.

16. The apparatus of claim 13, wherein the secondary power module is configured to monitor a voltage provided to the load device by the primary power module to determine if the at least one battery cell from the plurality of battery cells produces the amount of voltage outside the operational voltage range.

17. The apparatus of claim 13, wherein the secondary power module includes a voltage boost circuit configured to provide the second amount of voltage to the load device in response to receiving the third amount of voltage.

18. The system of claim 1, wherein the load device is implantable into the body of a human and the system is implantable into the body for powering the load device.

19. The system of claim 13, wherein the load device is implantable into the body of a human and the system is implantable into the body for powering the load device.

* * * * *